July 27, 1943. H. W. ANWAY 2,325,026
METHOD FOR TESTING FELTABLE FIBERS
Filed Jan. 15, 1940 4 Sheets-Sheet 1
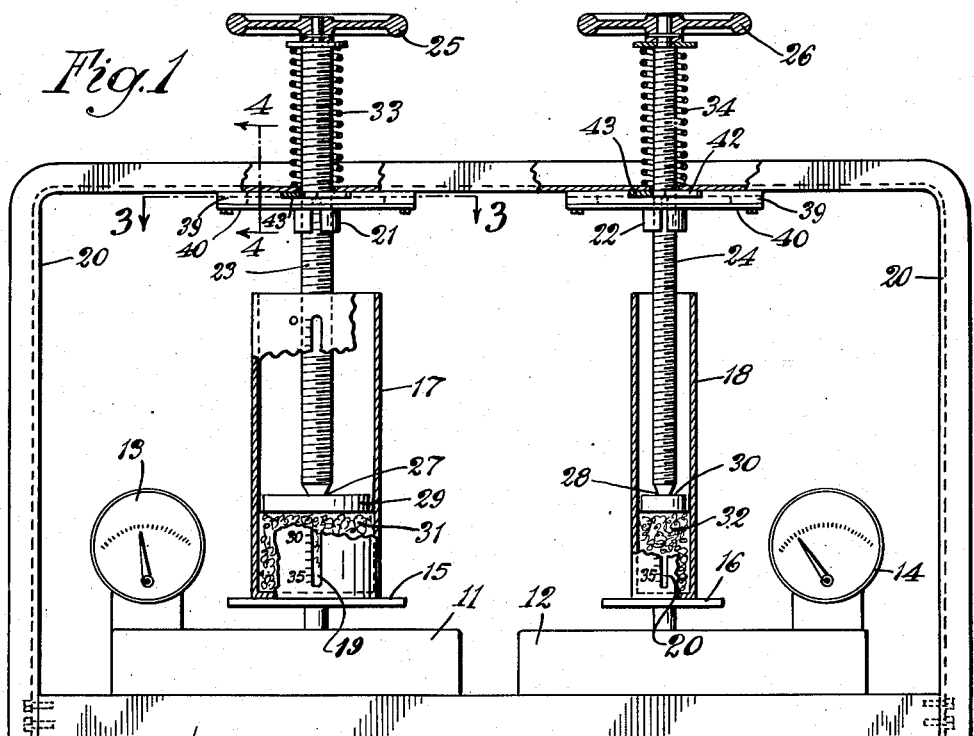
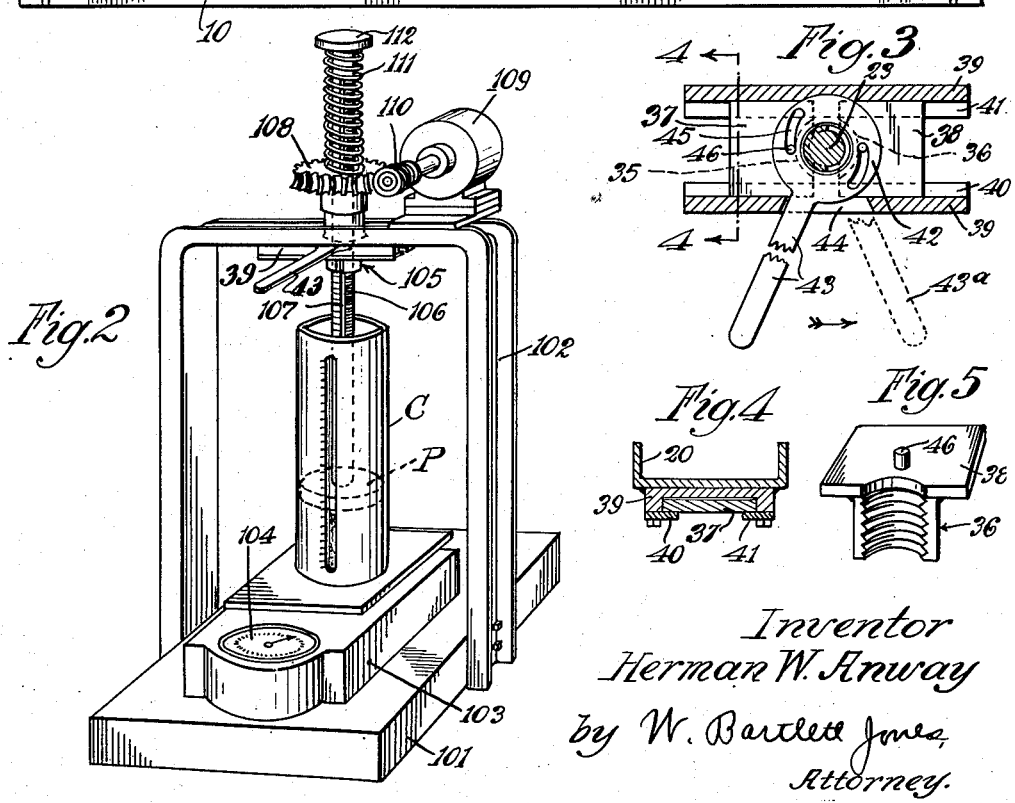
Inventor
Herman W. Anway
by W. Bartlett Jones,
Attorney.

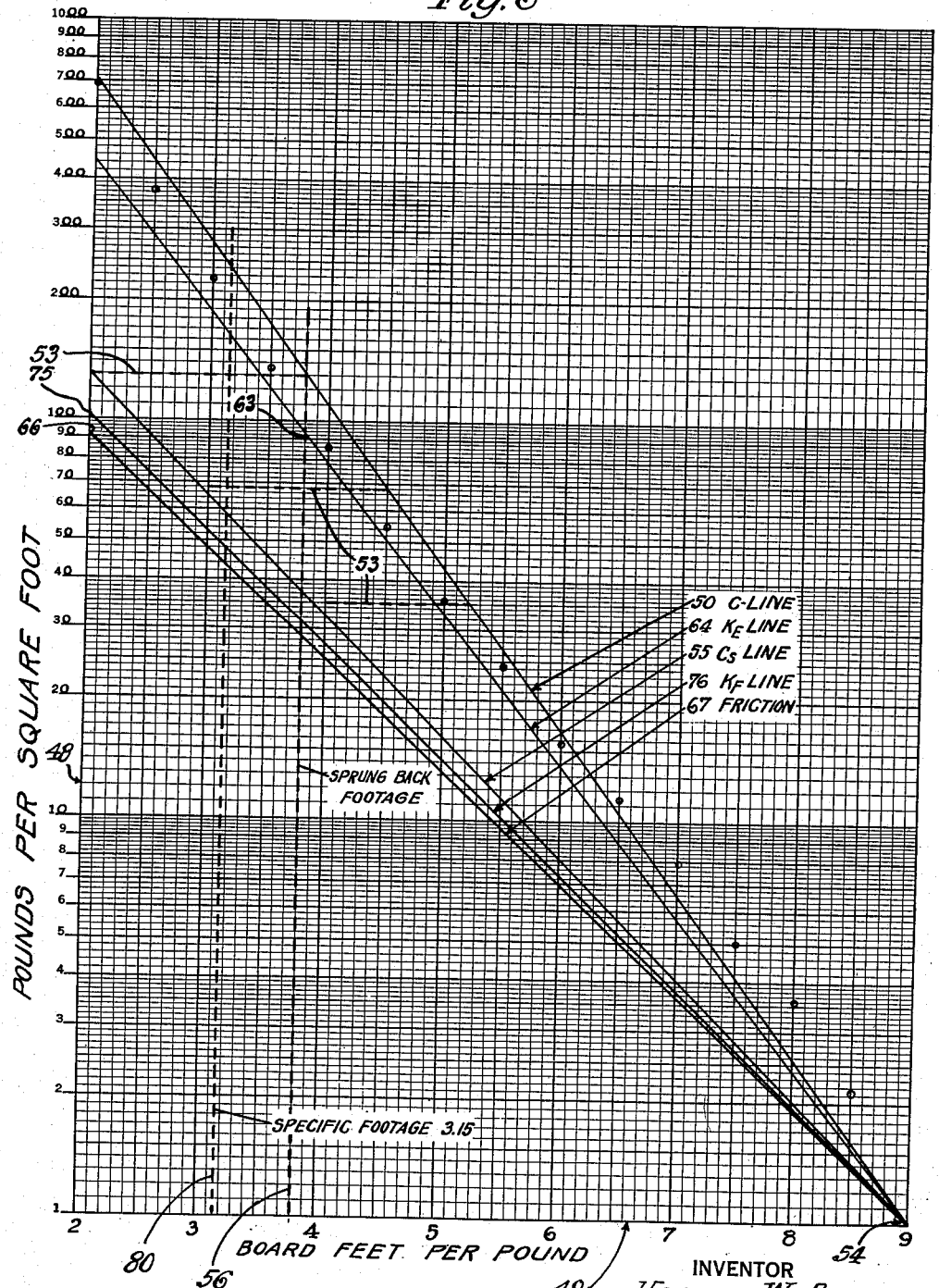

July 27, 1943.                H. W. ANWAY                2,325,026
                    METHOD FOR TESTING FELTABLE FIBERS
                        Filed Jan. 15, 1940          4 Sheets-Sheet 3
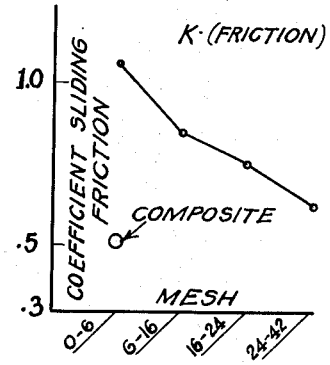
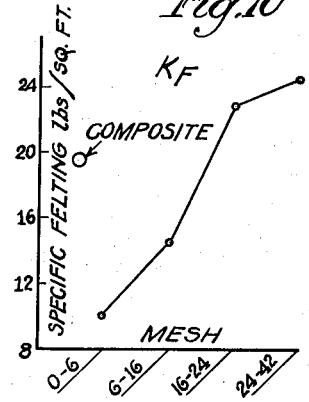
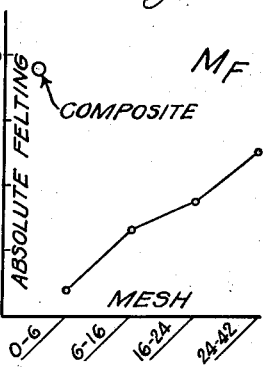
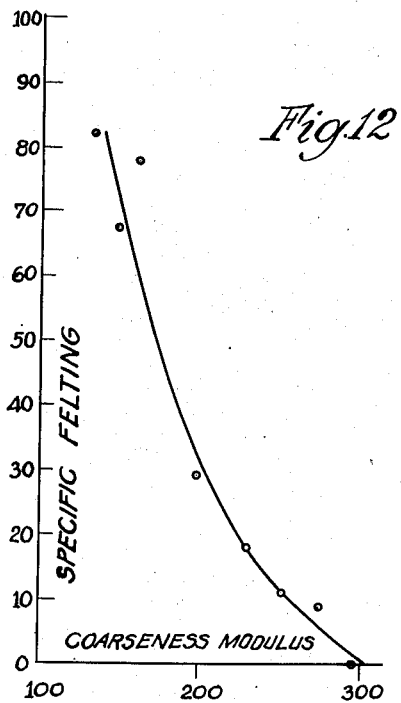
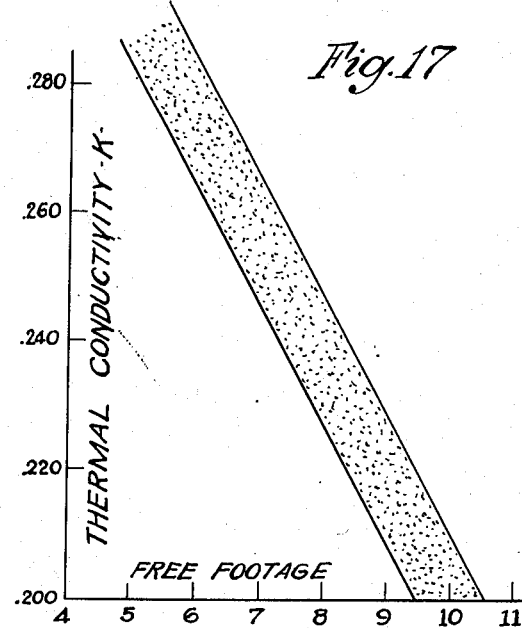
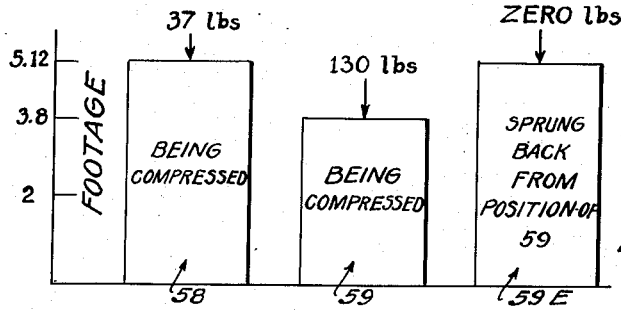
Inventor
Herman W. Anway
by W. Bartlett Jones,
    Attorney.

July 27, 1943.  H. W. ANWAY  2,325,026
METHOD FOR TESTING FELTABLE FIBERS
Filed Jan. 15, 1940  4 Sheets-Sheet 4

Inventor
Herman W. Anway
by W. Bartlett Jones,
Attorney.

Patented July 27, 1943

2,325,026

UNITED STATES PATENT OFFICE 2,325,026

METHOD FOR TESTING FELTABLE FIBERS

Herman W. Anway, Cloquet, Minn., assignor to Wood Conversion Company, Cloquet, Minn., a corporation of Delaware Application January 15, 1940, Serial No. 313,920

9 Claims. (Cl. 73—51)

The present invention relates to the testing of fibrous material to determine certain values for the comparison of properties. In particular it relates to the testing of fiber, such as wood fiber, to determine comparative values which are significant of the characteristics encountered in and resulting from the packing of the fibers into a felted mass for insulating, sound-deadening, packing, and other uses. For example, a mass of free fibers is to be compressed through a chute into a form or receptacle so that it will remain in ultimate position without settling. To do this the mass of fibers is compressed so that it tends to expand in the space, thus not to settle. A fiber mass compressed to exhibit resiliency, loses resiliency on standing, by reason of internal energy changes. Some fiber is more "springy" than others. Some tends to settle more than others. Some is more readily compressed than others. Some tangles better than others, or in other words "felts" much better. Some fiber has more friction as a mass in sliding over surfaces. All these properties are related to compression of the fiber mass, and broadly are herein classified as "compressive properties."

One of the most important properties of a felted mass is the insulation value, or in other words, its heat transmission resistance. This is high when the heat conductivity is low. A common unit is termed "K-value" wherein the lower the "K," the better the insulation. Many determinations of K-value in many kinds of fiber, have been made. Chemically treated fiber, untreated fiber, fractionated fiber and other forms have been tested and used. It has been found that an important one of the characteristic compressive properties of all these varieties of fiber has a regular functional relation to the K-value. Therefore, this certain compressive property is believed to be a fundamental measure of the value of the fiber, especially for insulation purposes.

It is therefore a particular object of the invention to determine this fundamental property.

It is also an object of the invention to provide apparatus and procedure for the determination of comparative values of compressive properties, so that various masses of fiber may be compared to determine the suitability for special uses, and so that fiber for certain uses may be "specified," and also may be provided to meet specifications.

Various other and ancillary objects and advantages of the invention will be apparent from the foregoing description and explanation of the invention. The apparatus herein described is very simple and provides data consisting of experimental readings and fixed constants. However, the use of such data to calculate certain properties and indices, is somewhat complicated. In order to simplify the description and explanation herein, the method of and apparatus for testing will be first described. The apparatus is represented diagrammatically and also in a preferred practical form.

In the accompanying drawings the apparatus, graphical explanations and the mathematical procedure are all illustrated.

Fig. 1 represents a simple piece of apparatus for the purpose of simplifying the explanation of the entire procedure.

Fig. 2 represents a practical apparatus in which a single compression unit is utilized with two different containers as shown in Fig. 1.

Fig. 3 represents in cross-section on line 3—3 of Fig. 1 a mechanical device permitting sudden release of the compression.

Fig. 4 represents another cross-section of the same device as Fig. 3 taken on line 4—4 of Fig. 1 and line 4—4 of Fig. 3.

Fig. 5 represents in perspective a portion of the split-nut structure involved in the device of Figs. 3 and 4.

Fig. 6 is a semi-logarithmic graph showing the lines determined mathematically, and explaining their derivation.

Fig. 7 is a diagrammatic explanation used as a short-cut explanation of determining elasticity.

Figs. 9, 10 and 11 are simple graphs showing the utility of the invention for comparing the same properties in fiber masses which are isolated fractions of a composite mass of fibers.

Fig. 12 is a graph showing the relation between the specific felting force (at 3.15 board feet of fiber) when plotted against the coarseness modulus which later is indicative of the particle size distribution.

Figure 13:
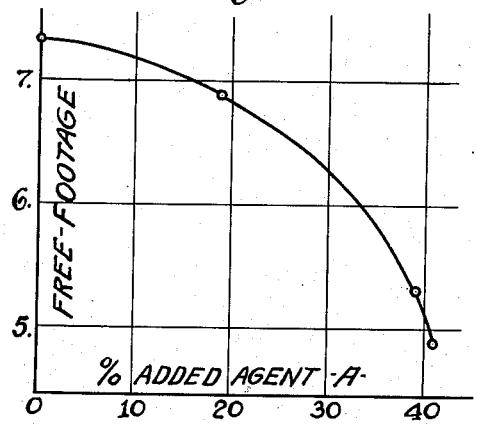
Figure 14:
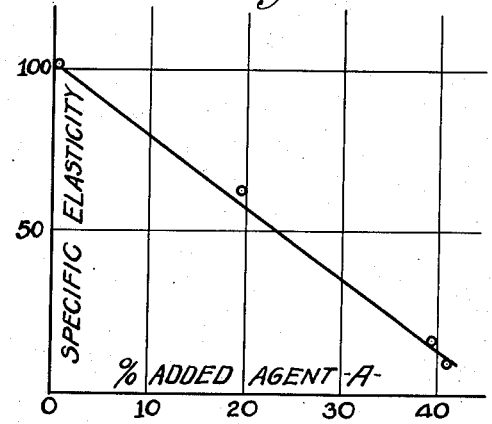

Figs. 13 and 14 respectively are graphs showing the effect of an added agent A upon the properties of free footage and specific elasticity.

Figure 15:
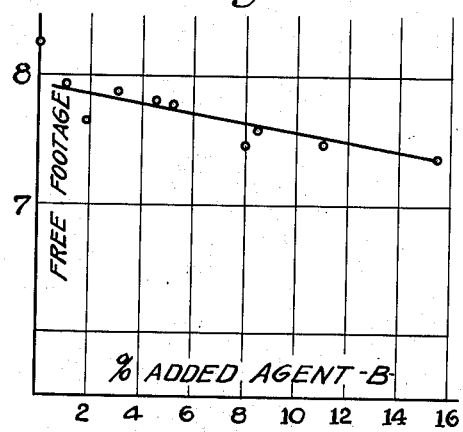
Figure 16:
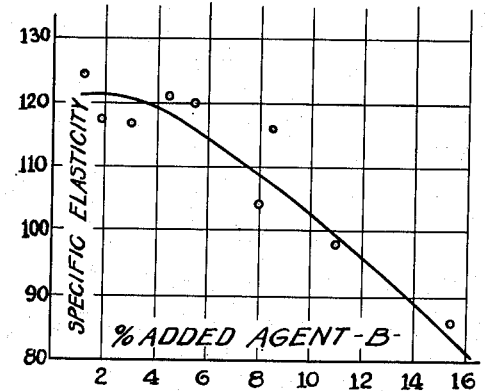

Figs. 15 and 16 respectively are graphs showing the effect of an added agent B upon the properties of free footage and specific elasticity.

Fig. 17 is a graph showing the correlation of a variety of specimens of the same fiber when the thermal-conductivities of the specimens are plotted against the free footage of the specimens.

In Fig. 1 sufficient elements for the test are shown in use at one time, for the purpose of explanation. A surface or bench 10 has two platform scales 11 and 12, with dials 13 and 14 and platforms 15 and 16. On platforms 15 and 16 are respectively a large cylinder 17 and a small cylinder 18 of radius R and r, of selected internal surface, such as the same metal, each cylinder having a vertical slit 19 and 20 respectively providing a scale calibrated in appropriate units. A frame 20 provides two nut portions 21 and 22 over the cylinders. Screws 23 and 24 turn in these nuts by suitable controlled means, as hand wheels 25 and 26. The screws at their ends rotatably carry at 27 and 28 flat plates 29 and 30 which fit loosely inside the cylinder nonrotatably with respect to the frame and cylinder when held by frictional contact with fiber in the container. Beneath the plates are shown test specimens 31 and 32 of fiber taken from the stock to be tested.

There are coiled compression springs 33 and 34 around the threaded shafts 23 and 24, and between the frame 20 and the hand wheels 25 and 26. These may function to raise the plates 29 and 30 quickly from the fiber upon release from or of the nut devices 21 and 22. The nut devices are constructed to permit this. While it is possible to release the nut from its engagement with the frame, to raise the screw, it is preferred to release the engagement of the nut and the threads of the screw. This may be accomplished by using a nut device which has two portions relatively movable for accomplishing this. Each nut is made in two portions, best shown in Figs. 3, 4 and 5. Fig. 3 shows a split nut having the complementary portions 35 and 36 (Fig. 5), with bases 37 and 38 which slide in guideways. On the frame 20 (Fig. 4) is secured a block 39 having a recess in which the bases 37 and 38 are slidable. Strips 40 and 41 are held by screws to the block 39, forming guide-ways for sliding the two nut portions toward and away from each other. There is a circular opening in the block 39 for receiving a disc-like body 42 with a handle 43 projecting through an opening 44 in the block 39. Arcuate slots 45 cut into disc 42 serve as cams on pins 46 mounted on the bases 37 and 38. Thus moving handle 43 to position (dotted line) 43ª, opens the split-nut structure to permit disengagement of the screw and nut, and the action of the springs to raise the compression plates.

The test specimens or masses 31 and 32 are shown as compressed to the same density, and the plates are at the same height in the cylinders. This is the result of using weights of specimens 31 and 32 to be tested, that are in proportion to the ultimate fiber volumes 31 and 32 shown in Fig. 1, where the columns have the same height, and hence the weights are proportional to the cross-sectional area of the cylinders, and to the densities of the fiber masses. For example where the radius R is 4 inches and the radius r is 1½ inches, the weights have the ratio of 64 to 9. In practice for wood fiber in such cylinders, the actual weights chosen are 158 grams for the large cylinder and 22 grams for the small cylinder.

In making a test predetermined masses of the material to be tested are placed in the cylinders and the plates slowly moved to compress the samples. The rate at which compression occurs is arbitrary and not important. However, it is important that both masses of the material should be compressed at the same rate, and that the rate be uniform and standardized for comparisons where a series of materials are involved. This may be done by power means (later described). If the reading of the scale 13 or 14 is plotted against density of the sample there is obtained a characteristic curve of exponential form which will be later referred to. A final observation is made on both masses when they reach the same arbitrarily selected density. If the pressure is released by moving both plates upwardly in the cylinders, there will be seen a "spring-back" or expansion of the compressed masses 31 and 32 to new positions. This arises from a resiliency of the fiber. An important difference in each cylinder thus becomes apparent. The expansion is not the same in each case. The density at expansion in the large cylinder is recorded as an important figure for calculations.

The failure of the two masses to show the same proportional "spring-back" is cause for inquiry, introducing certain principles involved in the test. When constantly moving pressure is placed upon a sample of fiber in a cylinder, work is done. This is utilized in overcoming the sliding friction of the mass on the cylinder wall, in overcoming elasticity of the mass as a unit, and in overcoming the internal friction between the fibers within the mass, involving shifting position and even breaking of fibers. Felting is the result of internal changes, and it is related to elasticity. Therefore, the recorded reading of each weighing scale is a composite figure depending upon these properties.

SLIDING FRICTION

When the pressure is released from the selected final density position, there is force opposing the tendency to spring back, so that the final spring back is not an accurate indication of resiliency. One element of this force is the friction between the wall of the cylinder and the expanding mass. Naturally the results are different in the two cylinders because the area per unit volume presenting friction is relatively greater in the smaller cylinder and its spring-back is less than that in the larger cylinder.

Practically, the spring-back in the cylinders is not recorded, nor used in determining friction. The total force readings at each final compressed density are recorded for calculating friction. Let $R$=radius large cylinder.
$r$=radius small cylinder.
$h$=an arbitrary column height to which both samples are compressed to have some arbitrary density.
$a$=component of force required to compress fiber in small cylinder, excluding component to overcome sliding friction.
$b$=component of force required to compress fiber in large cylinder, excluding component to overcome sliding friction.
$c$=component of force to overcome sliding friction in small container.
$d$=component of force to overcome sliding friction in large container.
$f$=final scale reading for small cylinder.
$F$=final scale reading for large cylinder.

Then:

(1) $\quad f = a + c$ (2) $\quad F = b + d$

Because compression is a volume effect, then (3) $\quad \dfrac{a}{b} = \dfrac{r^2}{R^2}$ or $a = \dfrac{br^2}{R^2}$ Because sliding friction is a surface effect, then (4) $\quad \dfrac{c}{d} = \dfrac{r}{R}$ or $c = \dfrac{dr}{R}$ Therefore, using (3) and (4) in (1)

(5) $\quad f = \dfrac{br^2}{R^2} + \dfrac{dr}{R}$

But (6) $\quad \dfrac{r}{R} = k$ which is a fixed constant for two selected cylinders. Substituting the value $k$ in (5), then (7) $\quad f = bk^2 + dk$ Solving (7) and (2) simultaneously $$d = \dfrac{f - k^2 F}{k - k^2}$$

For the specific cylinders (8 inches and 3 inches diameter) described, the value $k$ may be substituted to give (8) $\quad d = 4.269f - .6F$ Solving (8) and (4)

(9) $\quad c = 1.559f - .22F$

In the small cylinder of radius $r$, the force on the plate which compresses the fibers is $a$, and the force sliding the fibers is $c$. Consider an area to be tested as a unit area in a circular band of the fibers compressed to a height $h$. Then the sliding force $f'$ on the unit area is expressed:

(10) $\quad f' = \dfrac{c}{2\pi r h}$

In small-diameter columns it is approximately true that the said unit area exerts on the container wall the same unit pressure P as is exerted upon it by force $a$. This is expressed:

(11) $\quad P = \dfrac{a}{\pi r^2}$

Let K = a coefficient of friction, which in usual terms is the force which slides any two coacting surfaces divided by the force holding the surfaces together, or

(12) $\quad K = \dfrac{f'}{P}$

Therefore, from (10), (11) and (12), $$K = \dfrac{cr}{2ah}$$

In the same way, for the large cylinder

(13) $\quad K = \dfrac{dR}{2bh}$

But actually for the cylinders described (R=4) and (r=1.5), so

(14) $\quad K = \dfrac{2d}{bh} = \dfrac{3c}{4ah}$

The formula for the large cylinder is used in actual practice as

(15) $\quad K = \dfrac{2d}{bh}$ wherein $d$ is given in (8), $h$ is column height, and $b$ is found from (2) in terms of F and $d$.

EXAMPLE.—WOOD FIBER (For practical and mathematical convenience the density is expressed as its reciprocal unit in terms of "footage" or board feet per pound of fiber, one board-foot being 12 x 12 x 1 inches.) In the 8-inch cylinder is placed 158 grams of wood fiber, which is equivalent to 1 pound per square foot of cross-sectional area. This is compressed at a constant rate of 1 inch in 32.4 seconds to a column height ($h$) of 2 inches, or 2 board-feet per pound, with a pressure on the scale of 240 pounds. (The remaining operative procedure is omitted at this point and introduced later where it is pertinent.)

In the small cylinder is placed 22 grams of the same fiber, which is compressed at the same rate to the same final footage of 2 board-feet per pound, at a final pressure of 41 pounds. Thus, the values needed are F = 240
$f$ = 41

Using (8) $d = 4.269 \times 41 - .6 \times 240 = 32$
Using (2) $b = 240 - 32 = 208$
Using (15) the coefficient of friction is $$K = \dfrac{2 \times 32}{208 \times 2} = .154$$

ELASTICITY

Using the larger cylinder for data in determining compressive properties, depends upon the fact determined by many experiments that there is a simple mathematical relationship in experimental columns of small diameter, when a given procedure is used. Thus, it has been discovered with respect to the 8-inch cylinders and smaller cylinders, that a given rate of compression produces a substantially logarithmic relation between the footage of fiber and the compressive force as compression occurs. For an 8-inch cylinder the curve is practically useful, even though it departs but slightly from a true logarithmic relation. This will best be understood by applying data of Table I measured in compressing the fiber in the 8-inch cylinder as given in the example. In Table 1:

"Column 1" is the measured footage or height of the column under a constant rate of compression.

"Column 2" is the force measured on the supporting scale.

"Column 3" is the force of column 2 multiplied by a factor 2.86 to adjust the data to a similar column having one pound of fiber over a cross-sectional area of 1-square foot. The purpose of this is to bring certain of the ultimate values to be reported in units of "pounds per square-foot."

*Table I*

| Column 1 | Column 2 | Column 3 |
|---|---|---|
| Board feet per pound | Force in pounds, 8-inch diameter 158 gram specimen | Adjusted force in pounds, 1 lb. specimen |
| 8.5 | .75 | 2.14 |
| 8.0 | 1.25 | 3.6 |
| 7.5 | 1.75 | 5.0 |
| 7.0 | 2.75 | 7.9 |
| 6.5 | 4.0 | 11.4 |
| 6.0 | 5.5 | 15.7 |
| 5.5 | 8.5 | 24.3 |
| 5.0 | 12.5 | 35.8 |
| 4.5 | 19.0 | 54.5 |
| 4.0 | 30.0 | 85.9 |
| 3.5 | 47.0 | 134.5 |
| 3.0 | 80.0 | 228.5 |
| 2.5 | 130.0 | 372.0 |
| 2.0 | 240.0 | 686.0 |

Obviously, the plotting of column 1 against column 2 or column 3 will give the same mathematical relation. A direct plot has little visual significance. But if the logarithms of either of columns 2 or 3 are plotted against direct values of column 1, it is possible to draw a mean straight line which is mathematically useful. This line is mathematically significant of a definite order of changes in compressing. In Fig. 6 column 3 of Table I is plotted vertically on a log scale 48, and column 1 is plotted horizontally on an arithmetical scale 49. The circles are the measured data, and straight line 50 is drawn as the mean line of the data. A smaller cylinder produces less variation. Errors in observation explain part of the deviation. Line 50 is called the C-line for brevity, meaning the line of compression.

Another and related mathematical relation has been discovered. When a column of fiber is compressed to various heights at a selected but arbitrary regular rate of compression, and the pressure is released to permit immediate expansion, the height of the column on return and the height before return have a definite relation. By reason of the relationships established above, there is also a definite relation between the height after spring-back, and the force released to permit spring-back.

Table II gives an illustrative set of such readings taken at a regular rate of compression of 1 inch in 32.4 seconds and at immediate release during compression, in the large cylinder above described. The rate of compression is the same as used for Table I, in the 8-inch cylinder, using for each test, new batches of the same fiber used in the example.

*Table II*

| Column 1 | Column 2 | Column 3 |
|---|---|---|
| Height of column of fiber being compressed at regular rate | Compression reading on column when released (column 2, table 1) | Height of column when sprung back |
| Units in board feet per pound | Units in pounds | Units in board feet per pound |
| 2 | 240 | 3.8 |
| 3 | 80 | 4.5 |
| 4 | 30 | 5.2 |

For each action of spring-back, there is a compression reading (column 2) which is released and there are data of column heights before and after release. There is also a compression reading on the original compression curve corresponding to the spring-back height. These two observed and read compression values, adjusted to a one pound mass of fibers may be found in the adjusted values of the plot of the C-line 50. Thus, at the ordinate value in Fig. 6 which corresponds to either selected one of the two said compression values, a horizontal line may be drawn with its terminals determined by the abscissae values, which are column heights. The compression reading at the spring-back height has been selected as the ordinate for drawing each said line. Such horizontal lines are represented by the lines 53, whereby they fall under and terminate at their right ends in the C-line. The other ends of these lines also indicate a substantially straight line which tends to intersect the horizontal axis 49 (which is 1 and not zero on the log scale 48) at the same point 54 where line 50 intersects it. Taking this experimental tendency as a mathematical truth (justified later), and using the final density of footage 2 (Table I) and its spring back (the top-most line 53) and the intercept 54, the straight line 55 is drawn for graphic use. Line 55 is termed for brevity the $C_s$-line, meaning that it is determined by compression and spring-back. The abscissa of vertical line 56 represents the one measured "spring-back footage" needed for actual work. The common intercept 54 with the axis is significant. The mathematical significance of the $C_s$-line will be later explained.

Mathematically, the point 54 represents the footage at no applied force of compression. Practically, fibers cannot be massed at no compression at all because the bottom of the mass is compressed by the fibers above. The value is the result of extrapolation, and is herein considered as an absolute value, called "free-footage," or the density at zero compression. It has been noted that the log scale reads "1" at the line of scale 49. The force actually exerted at zero compression on the device (weighing scale) registering the plotted pressure values, is the weight of the fiber. Since column 3 of Table I is plotted on log scale 48 after conversion to a one-pound specimen, the intercept 54 is taken as a practical finite and absolute value, because at no compression the fiber will register in fact "one pound" on the weighing scale. Obviously, at this condition it can have no spring-back, and hence line 55 must pass through point 54. It has been found that many apparently uncorrelatable properties of a series of different fibers become correlated when plotted against "free-footage." The free-footage value has thus been found to be a measurable significant property of a fiber mass independent of its state of compression. The free-footage may combine other fundamental values, but in itself, it is capable of simple determination.

To determine it, reliance is placed upon the mathematical truths which obtain with the selected conditions establishing them, as above described. It has been found to be a satisfactory procedure to record a series of observations as given in Table I, sufficient to locate a mean straight line. For very crude work, two such observations will suffice. By releasing the fiber for spring-back, from a final compression point, such as 2 board-feet, the spring-back value determines one point of the $C_s$-line of which the free-footage intercept is known to be another, thus determining directly the $C_s$-line. Therefore, in the example, when 2-board feet is attained, the compression is released, and the spring-back recorded to determine the $C_s$-line 55.

The $C_s$-line, which is a mathematically convenient force line, is capable of interpretation to give useful information. The obvious application (and basis for drawing the $C_s$-line) is to indicate the spring-back footage from any compressed footage. The $C_s$-line interpreted as a force line indicates the summed forces lost in irrecoverable work. Where vertical line 56 at footage 3.8, as actually measured after spring back from footage 2 crosses $C_s$-line 55, it is thus read on the $C_s$-line 55 that 37 lbs. were lost in irrecoverable work; that is to overcome sliding friction and in producing felting. However, where line 56 crosses the C-line at a footage of 3.8 it is read that 130 lbs. were used in overcoming resistance to elasticity, sliding friction, and in producing felting. Since the felted condition in these two circumstances is substantially the same, and since resistance to sliding friction during compression from 3.8 to 2 footages and in expansion from 2 to 3.8 footages is substantially the same, it follows that the elasticity opposed the compressing force to the extent of the difference between 130 and 37 at 3.8 footage, or 93 lbs.

The graphic relations may be clarified by a short-cut diagrammatic illustration. In Fig. 7 three columns of fiber are illustrated at heights corresponding to the footages indicated on the scale at the left of the figure. The blocks 58 and 59 with their arrows at the top indicating a force on each column, are taken directly from the C-line. The block $59^E$ is the block 59 at its expanded height as read from the $C_1$-line.

It is important to note that if the compression process is halted and the confined material allowed to stand in a static condition, internal changes take place, not immediately, but rather slowly. This may be measured by drop in pressure until it becomes small. The rate at which this occurs may also be determined for comparisons. Thus kinetic elasticity is converted into "felting" by the expansive force expending itself internally in rearranging fibers to a stable or static condition. The potential elastic energy which is immediately available while compressing becomes largely lost on standing with the fiber mats confined at a fixed volume, the lost energy becoming fixed as felting energy.

From the foregoing it is obvious that in compressing the fiber, work is done upon it; that if the compression is immediately released a part of that work is recoverable; and that if the pressure is halted without release, the said recoverable work becomes less and less recoverable as time goes on to a point where practically none is recoverable. Thus, the work input goes to overcoming sliding friction, to overcoming elasticity, and to producing felting. That which overcomes elasticity may be converted to felting by standing under a suitable load fixedly to confine the fiber mass.

Thus, block 58 on standing will become static and substantially like block $59^E$. The felted conditions in blocks 59 and $59^E$ are substantially the same. Block 59 in expanding to block $59^E$ gives up energy because of its instant elasticity and produces a static block $59^E$ in which the felting energy is the same as the summed energies of felting and elasticity in block 58. The force required at footage 3.8 (block 59) to effect this conversion is the difference between 130 and 37, or 93 pounds as the elastic force instantly and actively opposed in block 59, as it is being initially compressed. Therefore, the value 93 may be taken as the instant elastic force in the initial compression at 3.8 footage.

Point 63 is plotted on the 3.8 footage line 56 at 93 lbs., and a straight line 64 is drawn from point 63 to point 54. This line is the plot of specific elasticities for the various footages, there being obviously no elasticity at the free footage point 54. This line 64 is called the specific elastic-line or "$K_E$-line." Its slope is a constant which is taken as the "absolute" elasticity of the fiber. As pointed out there is no specific elasticity at the free footage condition, and the specific elasticity varies according to the degree of compression. But the rate at which these vary is indicated by the slope of the $K_E$-line. Experience with many fiber masses shows this slope to be a characteristic property of the particular fiber as tested herein for comparisons.

The slope of a straight line is readily determined by known mathematical procedure. Select two points on the line. Divide the difference in their ordinate ($y$) values by the difference in the abscissae ($x$) values, and the result is for line 64, the value $-.377$. This is the absolute elasticity herein termed $M_E$, for which the minus sign may be neglected. However, as the absolute elasticity, it eliminates the degree of compression.

FELTING

The total applied compression force after taking out that for elasticity, gives a residue involving sliding friction, and internal friction (which is felting force). The frictional force may be determined by the formulas given, and therefore the residue is largely determinative of and dependent upon the felting force.

The friction is calculated, using those formulas given, and the data of Table I for the large cylinder, or the C-line in Fig. 6. But it has been determined from the data of the example that in the 8-inch cylinder the sliding friction force at 2 board feet is 32 lbs. Converting this by the factor 2.86 for the graphical chart on the 1-pound basis, the sliding friction force at footage 2 is 91.5 pounds.

Thus, at footage 2.00 in the compression, 91.5 lbs. of the C-line 701 lbs. is used to overcome sliding friction for the chart of Fig. 6. Experience has shown that frictional forces at other densities form a substantially straight line in Fig. 6, passing through the point 54 of free footage. Accordingly, point 66 is plotted at the values footage 2 and 91.5 pounds. Line 67 connects points 54 and 66, and represents the specific frictional forces at the different footages.

There is approximation for practicality in directing the friction line 67 to be drawn to the free-footage point 54. In reading values on the friction line 67, one should not overlook the fact that at the point 54 the ordinate value on the chart Fig. 6 is 1, which is zero compression, but it is the scale reading resulting from the weight of the fiber. Therefore, at point 54 one does not read that the friction value is 1 pound, but rather it is read as zero. The deduction of one from the ordinate values of line 67 is ignored at the higher values which occur in the practical working range, because it is less than the experimental errors in the process and in the calculations. For example, 2-board feet per pound, at the point 66, the value can hardly be read from the chart any closer than one pound. At 7 board feet per pound, one would read on the friction line 67, 3.6 pounds from the ordinate scale, but one would know that this should be 2.6 pounds in terms of the component of the applied force to overcome friction.

Figure 8:
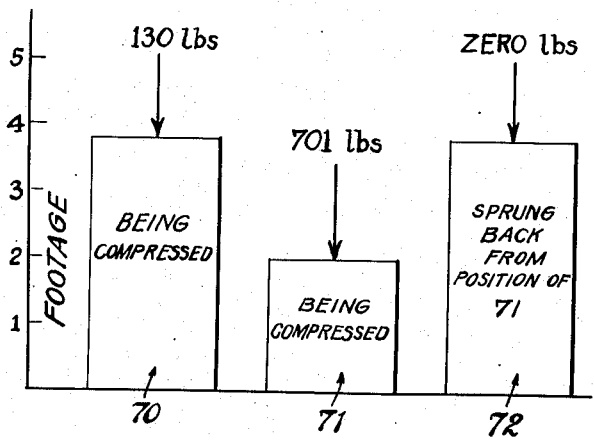
Fig. 8 is a diagrammatic explanation used as a short-cut explanation of determining felting.

The determination of felting may be done by graphical derivation from the lines already described on the semi-log chart Fig. 6. But the reasons are not readily obvious. The operation is best explained by a specific reference to a given condition, as in Fig. 8. Herein blocks 70 and 71 represent the column being initially compressed. Block 72 represents block 71, originally at 2 board-feet, sprung back to 3.8 board-feet. Block 70 has been chosen at 3.8 board-feet on the way down to 2 board-feet. From C-line 50 (or the original data) it is known that 130 lbs. pressure is required in the original compression to attain 3.8 board-feet. From the friction-line 67 it may be read that at this point on block 70, 28 lbs. is used to overcome friction. This leaves a balance of 102 lbs. which is overcoming elasticity and producing felting. It has been stated that if block 70 was allowed to stand the same would become static and practically like block 72. Thus practically all of the 102 lbs. would eventually go into felting energy. Therefore 102 lbs. is taken as the force component going to felting energy in the static block 72, or in the block 70 when it becomes static. However, block 72 becomes static by expansion from the condition of block 71. The felting in block 72 therefore existed in block 71 while the block 71 was elastic. Accordingly, the 102 lbs. represents fairly accurately the force component going to felting energy of block 71 at 2 board-feet. It is therefore the determinant for the felting line, the slope of which is taken as the absolute felting property of the fiber, giving its felting property independently of degree of compression or state of felting. By plotting the point 75 at 102 lbs. and 2 board-feet, and by drawing line 76 from point 75 to point 54, the resulting felting line, or the $K_F$-line, represents specific felting values at any footage, as well as a constant for felting. Thus, at 3.15 board-feet the felting force is 48 lbs. The slope of the curve is $-.286$, which is the absolute felting property, or constant $M_F$. The minus sign may be neglected.

To solve graphically in the simplest way for the felting curve, given the C-line 50, the sprung footage from final compression, the final compressed footage, and the friction line 67, proceed as follows:

Where the sprung-footage line 56 in the plot crosses the C-line 50 and the friction line 67, subtract the ordinate values of the two intercepts and plot the difference as a point on the line of the footage from which the spring-back took place, or in other words at the footage existing at the end of the experimental compression. Draw a straight line from said plotted point to the free-footage point 54. This line gives the specific felting at each footage plotted, and its slope gives the absolute felting property.

Specific Comparisons

For practical purposes fibers may be compared at some arbitrarily selected footage, which is chosen as one close to useful footages. Thus, arbitrarily, comparisons are made herein at 3.15 footage and the values given as "specific" are selected at this footage. Line 80 in Fig. 6 is drawn at 3.15 footage and designated "specific footage" for reading off "specific" values.

Summary of Results from Illustrative Data and Charts

Table III

| Property | Specific at 3.15 board feet | Absolute |
|---|---|---|
| Free footage | | 9 board-feet per pound. |
| Elasticity | 165 lbs | .377 (a coefficient). |
| Felting | 48 lbs | .286 (a coefficient). |
| Friction | 42 lbs.¹ | .308 (a coefficient). |

¹ Only a corrective value.

The above described process has been applied to many kinds of fiber, such as wood fiber as made in the machine of Asplund Patent No. 2,145,851, with and without various treating materials employed in the Asplund machine according to Asplund Patent No. 2,047,170. In particular, it has been found that the "free footage" is a property which correlates variations in samples, treated or untreated, better and more significantly than any other property. Fibers such as of Palco wool, chemical or semi-chemical wood pulp, mineral wool, cotton, cotton linters, jute, kapok, red wood bark, MacMillan fiber, and others have been tested by the invention for comparative purposes. Wood fiber fractions and mixtures of fractions have been tested to produce a fiber mass of specific properties.

The invention is subject to many variations, but where comparisons are made a set procedure is adopted. This calls for specifying the rate of compression, the densities of fiber at which data are taken, the sizes of containers and the weight of fiber for each container.

The following is a summary of procedure, devoid of explanation made herein for the purpose of transfer bodily to other applications for patent which will involve reference to this application, and use of a procedure within it. The details given are therefore not limitations.

Practical Procedure

Place 158 grams of loosened fiber in a cylinder of 8-inches diameter and 22 grams of the same loosened fiber in a 3-inch diameter cylinder presenting the same character of interior surface. Place the cylinder on a platform scale adjusted to read zero (or else the weight of the fiber, the difference being negligible). With a flat plate compress the large column of fiber at the rate of 1 inch in 32.4 seconds until it is 2 inches high (a reciprocal density of 2 board-feet per pound). Record the pressure on the scale as reading P pounds, and the corresponding height of the column, at approximately each half-inch of advance, or a sufficient number of observations to locate a mean straight line. Record the final pressure Q at column height of 2 inches. Upon attaining said last mentioned height, immediately remove the plate to release the column. Measure the height (board-feet per pound) attained by the column after such spring-back, and record as H inches (or board-feet per pound).

Then substitute the smaller cylinder, and compress at the same rate until the column height is 2 inches (board-feet per pound), and record the pressure as R pounds.

The following data are thus obtained:

Table IV

| Board-feet per pound or "footage" | Footage on 8-inch spring-back | 8-inch column | 3-inch column |
|---|---|---|---|
| 2 (The series) | H | Q (The series P) | R |

Select semi-log graph paper having a log scale vertically beginning at log of 1, (which is zero), and mark equal divisions of "footage" units horizontally. On the chart, plot the series of observations using $P \times 2.86$ and the point: 2 footage and $Q \times 2.86$. Draw a mean straight line through these points. Where the line cuts the bottom of the chart (at 1), designate the point and the reading as "free footage." Label the straight line "C-line," or "compression line."

From footage H on the C-line draw a horizontal line to a point of intersection with the line for footage 2. Draw a straight line from this point to the "free-footage" and label the line "$C_s$-line," or "spring-back line." Draw a vertical line at H footage and label "sprung-back footage." On the latter line, subtract the ordinate values of the intercepts with the C-line and C$_s$-line, and record the difference. Mark this difference on the log scale as a point on the H-footage line, draw a straight line from the point to the "free footage" point, and label "K$_E$-line." Take any two points on the K$_E$-line. Subtract the ordinate values (the log units, not the pounds) and divide the difference by the difference of the free-footage values. Neglect the minus sign and record the value as M$_E$ or the "Absolute elasticity." Draw a vertical line through 3.15 footage and mark "specific footage." At the intercept of the K$_E$-line and the specific-footage line, record the force value as the "specific elasticity."

Using the formula (wherein for the large cylinder $y$=friction at 2 board-feet)

$$y = 2.86 \, (4.269R - .6Q)$$

solve for $y$. Using the formula (wherein K=coefficient of friction)

$$K = \frac{8.538R - 1.2Q}{3.2Q - 8.538R}$$

solve for the value K.

On the vertical line for footage of 2, plot the value of $y$, and draw a straight line to the free footage, marking the line "friction line." On the friction line at H-footage record the force value as a "deduction" value. On the C-line at H-footage read the force value, subtract from it the said deduction value, and record the difference as "felting at 2 board-feet." Plot this felting value on the vertical line for 2 board-feet, connect the point by a straight line with the free-footage point, and label the line "K$_F$-line" or "felting line." Determine the slope of the K$_F$-line by dividing the difference in ordinate values (the log units, not the pounds) of two selected points in it by the difference in footage values of said two points, and label the figure so obtained with or without the minus sign as "absolute felting" or "M$_F$." At the specific-footage on the K$_F$-line record the force value as "specific felting." Thus the values determined are compressive properties, listed in Table V.

*Table V*

| Absolute values | Specific values (at 3.15 footage) |
|---|---|
| Free footage | |
| Absolute elasticity (M$_E$) | Specific elasticity (K$_E$). |
| Absolute felting (M$_F$) | Specific felting (K$_F$). |
| Coefficient of friction (K) | |

On the lines: C-line, C$_s$-line by projecting horizontally to the C-line, K$_E$-line, friction line, K$_F$-line, may be read for any selected footage the following values, respectively: pounds per sq. ft. in compressing, the spring-back height obtainable at any time on releasing during the compression, pounds per sq. ft. exerted by elasticity at any point in the compression, pounds per sq. ft. used in overcoming friction while compressing, and pounds per sq. ft. used in producing felting at any point in the compression.

ACCURACY OF RESULTS

The figures obtainable are obviously not precise, due to errors in observation, errors in sampling (two containers), and approximations of fact upon which the procedure is based. However, there is a fair and useful check, making the results useful for comparison. It is pointed out that both the mechanical and the graphic procedures are quick and simple. The log chart Fig. 6 is a key to a system of straight lines for graphic solutions. True mathematical derivations would require the K$_E$-line, the K$_F$-line, and the friction line 67, to curve downwardly and approach zero value at infinity on the log ordinate scale, thus making the loci of the lines mathematically indeterminate from the one spring-back operation. By the expedient of adding the value one to the true values, and thereby locating the lines through the free footage point 54, the lines become straight lines for practical usage.

PRACTICAL APPARATUS

In practice a simple testing machine is used with a power driven motor to provide a constant rate of compression. The two cylinders are used at different times with change of presser plates. Such a machine is shown in Fig. 2. It has a base 101, a U-frame 102, a platform scale 103 set on the base, with force-dial 104. A split nut structure 105, as described for Fig. 1, is mounted on frame 102. Screw 106 is threaded to engage the nut, and grooved at 107 to receive gear 108 which is splined into said groove. A motor 109 has a worm gear 110 meshing with gear 108. Spring 111 is compressed between a head 112 on the screw shaft 106, and serves also to hold the gear 108 against frame 102. The letter C designates either cylinder 17 or 18, and the letter P represents the corresponding presser plates 29 or 30.

An important use of the compressive properties relates to the choice of particular machines to make fibers, or the operation of a single machine. For example, given two machines A and B according to Asplund Patent No. 2,145,851, of two different diameters of grinding plates, it has been determined that fiber made from both machines of the same wood, having substantially the same average particle size, have entirely different compressive properties. Thus machine A gives fiber characterized by a much lower coefficient of sliding friction, higher free footage, specific elasticity and specific felting, and lower values of absolute elasticity and absolute felting.

It has been determined by fractionation of such two fibers that the particle size distribution is different. Different fractions of fibers have been tested for their compressive properties, and in general there is a systematic change in these properties according to progressive ranges of sizes in the fractions of a fiber mass. This point is illustrated in Figs. 9, 10 and 11.

Figs. 9, 10 and 11 represent studies on fractions of a fiber mass and a composite sample combining the fractions. The fiber used was Jack pine made in an Asplund machine. The fractions separated by screening wet through screens of mesh (per inch) 0–6, 6–16, 16–24 and 24–42, as shown in the figures. The original fiber (composite) is represented as to its properties in comparison with the fractions. Fig. 9 shows that coefficient of sliding friction is less as the fiber fineness is increased. Fig. 10 shows that the specific felting (at 3.15 footage) increases as fiber fineness increases. Fig. 11 shows that the absolute felting property increases as the fiber fineness increases. In other words better felting obtains with finer fibers.

The Figures 9 to 11 also show that the composite sample may differ widely in its properties from the fractions.

COARSENESS MODULUS

The particle size distribution of fibers may be expressed significantly by a modulus, obtained by screening to fractions, and weight-summing the percentages of the fractions. This is a well known procedure. As the modulus increases the general coarseness increases. Thus, by expressing the coarseness modulus for the fiber, fibers may be classified to indicate a series of different coarseness, and properties plotted against the series.

Thus in Fig. 12, a series of fibers vary only in coarseness modulus, have been treated. The specific felting property has been plotted against the modulus. This shows that as the fiber is generally finer it felts better.

TREATED FIBERS

A series of fibers made by the Asplund machine from Jack pine, while adding with the wood a treating substance A to alter the fibers as formed, is shown in Fig. 13 and Fig. 14. Fig. 13 shows the free-footage plotted against the percentage of material A added to the wood. The free-footage is lowered as A increases, and part of this is traceable to weighting the substance with material A. Fig. 14 shows the effect of A on specific elasticity, the fibers being less resilient as A is increased.

In another series of fibers of the same wood, the treating material B was added with the wood. Fig. 15 shows that as B is increased the free-footage drops. Fig. 16 shows that as B is increased the specific elasticity drops.

FREE-FOOTAGE AS A KEY TO CORRELATION

As stated early in this description, the free-footage value appears to be an absolute value comprehensive of the other compressive properties, all bundled into one value. Using the other compressive properties, it has not been found possible to correlate in one scheme, the properties of widely different fibers, such as fiber from a specific wood, fractions thereof, the same fiber with various chemical treatments, and different batches of any of these distinctive in their particle size distribution. However, when a property, such as the thermal insulation value (K-value) water repellency, fire resistance, permanence to heat, and others, are plotted against the free-footage, a correlation is obtained. Sometimes this may be linear or complex. As an example, Fig. 17 shows thermal conductivity plotted against free footage. The shaded band in said figure has been actually determined by plotting 48 samples of wood fiber having variations in particle size, with and without added treating agents, and drawing the lines bounding the average area determined by the specific plots. 75% of the points plotted lie within the band. This shows that a simple test of a mass of such fibers for free-footage, will given an indication of its K-value, without the necessity of knowing the particle size, or treatment, or determining the actual K-value. Such determination is prolonged and tedious. Several specimens, to get an average, may be run according to the present invention, to determine free footage. Each such test takes but a few minutes.

TABLE VI

For the purpose of reference, and to illustrate the application of the present invention to other fibers, there are given in Table VI numerous fibers, properties determined by the present invention, and other data. The material "pin fiber" is fiber made directly from wood by pins projecting centrifugally from a high-speed rotor, positioned to brush fibers out of wood moved into the path of the ends of the pins. This is the so-called MacMillan process.

*Table VI*

| Property | Jack pine Asplund | Aspen Asplund | Red wood bark | Pin fiber | Loose mineral wool | Cotton linters | Jute |
|---|---|---|---|---|---|---|---|
| Coefficient of sliding friction | .655 | .363 | .484 | .491 | .550 | .735 | 1.42 |
| Free footage | 8.00 | 7.82 | 6.26 | 4.24 | 2.23 | 7.25 | 7.41 |
| Specific elasticity $K_E$ | 179. | 151.5 | 42. | 8.4 |  | 45. | 50. |
| Absolute elasticity $M_E$ | .460 | .450 | .524 | .813 | .363 | .400 | .319 |
| Specific felting $K_F$ | 98. | 120. | 23.5 |  |  | 28.0 | 17.5 |
| Absolute felting $M_F$ | .408 | .445 | .442 |  | .353 | .351 | .293 |
| Thermal conductivity | .246 | .242 | .249 | .283 | .234 | .237 |  |
| Particle size: |  |  |  |  |  |  |  |
| 1st fraction ...per cent | 22.8 | 40.0 | 58.6 | 15.6 |  | 53. |  |
| 2d fraction ...do | 21.2 | 9.4 | 7. | 7.6 |  | 23.2 |  |
| 3d fraction ...do | 18.8 | 20. | 15.8 | 31.6 |  | 5.2 |  |
| 4th fraction ...do | 23.4 | 20. | 16. | 30.4 |  | 15.4 |  |
| Past 4th ...do | 13.8 | 10.6 | 2.6 | 15.8 |  | 3.2 |  |
| Coarseness modulus | 215.8 | 249.2 | 303. | 178.8 |  | 307.4 |  |

Various uses of the present invention may be made. Among them is the subject matter of my copending application Serial No. 313,919, filed January 15, 1940, and the apparatus herein described is claimed in my copending application, Serial No. 414,078, filed October 8, 1941, as a division of the present application.

In the appended claims the individual tests and the procedure collectively are claimed as the invention.

I claim:

1. The method of testing feltable fibers for determining comparative values and compressive properties, which comprises forming two axial columns of test specimens of loose heterogeneous masses of said fibers, said columns having different known cross-sectional areas and column-defining walls of substantially the same frictional characteristics, the weights of the fibers in the two columns being proportional to the said areas, compressing each column axially at the same regular rate of compression, determining the force exerted by the end of the first column at a plurality of known densities of the fiber mass during the compression and before complete compression including a final density at which the fibers are felted and yet further feltable, immediately releasing the pressure upon attaining said final density to permit said column to exert any elasticity therein and expand to a decreased density within the confining wall surface, measuring the density after release, and then determining the force exerted by the end of the second column when it attains the said and same final density as the first column, whereby the known and determined values aforesaid may be solved by formulas to provide one or more of the following comparative values of the fibers as a mass: coefficient of sliding friction on the said wall material, density at zero compression, absolute elasticity, absolute felting quality, and the approximate components of the compressive force on the first column at any density thereof which is overcoming (1) sliding friction on the container, (2) elasticity of the mass as instantly felted, and (3) resistance to change of position of the fibers in producing felting.

2. The method of testing feltable fibers to determine the frictional characteristic of a sliding mass of said fibers which comprises forming two axial cylinders of test specimens of loose heterogeneous masses of said fibers, said columns having known radii of R and r and column defining walls of substantially the same frictional characteristics, the weights of the fibers in the two columns being proportional to the cross-sectional areas, compressing each column axially at the same regular rate of compression, determining the force exerted by the end of each column when at the same density, and determining the coefficient of friction between the fibers and the wall-defining material by application of formulas involving the observed forces and the known radii R and r.

3. The method of testing feltable fibers to determine the frictional characteristic of a sliding mass of said fibers which comprises forming two axial cylinders of test specimens of loose heterogeneous masses of said fibers, said columns having known radii of R and r and column defining walls of substantially the same frictional characteristics, the weights of the fibers in the two columns being proportional to the cross-sectional areas, compressing each column axially at the same regular rate of compression, determining the force exerted by the end of each column when at the same density, and determining the coefficient of friction between the fibers and the wall-defining material by application of the formulas $$K = \frac{2d}{bh},$$

$$d = \frac{f - k^2 F}{k - k^2}$$

$$F = b + d$$

wherein

K = coefficient of friction
F = final force in cylinder R
f = final force in cylinder r $$k = \frac{r}{R}, \text{ and}$$

h = column height.

4. The method of testing feltable fibers to determine the frictional characteristic of a sliding mass of said fibers which comprises forming two axial columns of test specimens of loose heterogeneous masses of said fibers, said columns having cross-sectional areas of different known sizes and column defining walls of substantially the same frictional characteristics, the weights of the fibers in the two columns being proportional to the cross-sectional areas, compressing each column axially at the same regular rate of compression, determining the force exerted by the end of each column when at the same density, and from the known values and observed forces, which are different because of friction with the container and because of a difference in ratio of sliding surface to volume of fiber, calculating values indicative of said frictional forces.

5. The method of testing feltable fibers to determine elastic properties thereof which comprises forming an axial column of a test specimen of a loose heterogeneous mass of said fibers, said column having a known cross-sectional area and a known weight of fibers, compressing the column axially at a regular rate of compression, measuring the force exerted by the end of the column at a plurality of densities including a final density at which the fibers are felted and further feltable, releasing the compressing force immediately upon attaining said final density so as to permit any elasticity in the fiber mass freely to expand the column, and measuring the density of the expanded column, whereby the known and observed values permit calculation of values indicative of the elastic properties of the fiber.

6. The method of testing feltable fibers to determine elastic properties thereof which comprises forming an axial column of a test specimen of a loose heterogeneous mass of said fibers, said column having a known cross-sectional area and a known weight of fibers, compressing the column axially at a regular rate of compression, measuring the force exerted by the end of the column at a plurality of densities including a final density at which the fibers are felted and further feltable, releasing the compressing force immediately upon attaining said final density so as to permit any elasticity in the fiber mass freely to expand the column, measuring the density of the expanded column, converting the observed force values by the ratio $$\frac{1 \text{ (force unit)}}{\text{weight of fiber column (in force units)}}$$

plotting vertically the logarithms of the converted values against the reciprocal values of the corresponding observed densities, drawing a mean straight line through the observed values to secure an intercept with the plot line of log 1, drawing a horizontal line from said mean straight line at the point thereon corresponding to the expanded density to the said final density reciprocal, and connecting the resulting point by a straight line to the said intercept, then where the plot line corresponding to the reciprocal of the density of the expanded column crosses the two straight lines on the plot, subtract the values whose logs are read on the said two straight lines, plot on said plot line a point corresponding to the resulting difference, and draw a straight line through said point and the first-mentioned intercept, whereby said last-mentioned line indicates elastic force at any density, and its slope indicates an elastic property of the fibers irrespective of state of compression.

7. The method of testing feltable fibers to determine a value indicative of the felting property thereof, which comprises forming in an axial container a column of a loose heterogeneous mass of said fibers with a known weight of fibers and a known cross-sectional area, compressing the column axially in said container at a regular rate of compression to a final density at which the column is felted and yet feltable, releasing the compression force upon attaining said final density so as to permit any elasticity in the fiber mass freely to expand the column in said container to a less density, determining the force required initially to compress the column to said expanded density, subtracting from said force the component thereof which is representative of the component to overcome sliding friction in said container at said expanded density giving as a balance the force to produce felting in initially compressing the column to the final density.

8. The method of testing feltable fibers to determine felting properties thereof which comprises forming an axial column of a test specimen of a loose heterogeneous mass of said fibers in an axial container, said column having a known cross-sectional area and a known weight of fibers, compressing the column axially in said container at a regular rate of compression, measuring the force exerted by the end of the column at a plurality of densities including a final density at which the fibers are felted and further feltable, releasing the compressing force immediately upon attaining said final density so as to permit any elasticity in the fiber mass freely to expand the column, measuring the density of the expanded column, converting the observed force values by the ratio $$\frac{1 \text{ (force unit)}}{\text{weight of fiber column (in force units)}}$$

plotting vertically the logarithms of the converted values against the reciprocal values of the corresponding observed densities, drawing a mean straight line through the observed values to secure an intercept with the plot line of log 1, determining the sliding friction force existing at the end of the compression between said fiber mass and the container, plotting said force at a point on the plot lying on the line of the reciprocal of the final density, connecting said point by a straight line with the said intercept on line of log 1, then on the line of the reciprocal of the density after expansion subtract the ordinate values of the two straight lines, plot the resulting difference as a point on the line of the reciprocal of the final density, and connect the said last-mentioned point by a straight line with the said intercept on the line of log 1, whereby said last-mentioned straight line indicates felting force at any density, and its slope indicates an absolute felting property of the fibers irrespective of state of compression.

9. The method of testing feltable fibers to determine a value indicative of the felting property thereof, which comprises determining a specific felting force at a specific density as in claim 6, plotting the reciprocal of said specific density and the log of said specific felting force in terms of the force needed for a column having a force-unit weight of fibers, on a plot having logarithms of force units vertically and reciprocals of density units horizontally, and connecting by a straight line said plotted point to the point of free footage at log of 1 force unit, whereby said straight line has a slope indicative of a felting property of the mass independent of the state of compression.

HERMAN W. ANWAY.

CERTIFICATE OF CORRECTION.

Patent No. 2,325,026.   July 27, 1943.

HERMAN W. ANWAY.

It is hereby certified that error appears in the printed specification of the above numbered patent requiring correction as follows: Page 3, first column, line 49, for "coacting" read --contacting--; page 5, second column, line 54, before "2-board feet" insert --at--; page 8, second column, line 4, for "given" read --give--; page 10, second column, line 21, for "claim 6" read --claim 7--; and that the said Letters Patent should be read with this correction therein that the same may conform to the record of case in the Patent Office, Signed and sealed this 14th day of September, A. D. 1943.

(Seal)

Henry Van Arsdale,
Acting Commissioner of Patents.